US008246304B2

United States Patent
Egedal

(10) Patent No.: US 8,246,304 B2
(45) Date of Patent: *Aug. 21, 2012

(54) WIND TURBINE AND METHOD OF DETERMINING AT LEAST ONE ROTATION PARAMETER OF A WIND TURBINE ROTOR

(75) Inventor: Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/288,200

(22) Filed: Nov. 3, 2011

(65) Prior Publication Data

US 2012/0042727 A1    Feb. 23, 2012

Related U.S. Application Data

(62) Division of application No. 12/224,901, filed as application No. PCT/EP2007/050041 on Jan. 3, 2007, now Pat. No. 8,092,174.

(30) Foreign Application Priority Data

Mar. 15, 2006   (EP) ..................................... 06005334

(51) Int. Cl.
   *F03B 3/12*   (2006.01)
(52) U.S. Cl. ............. 416/61; 73/510; 73/511; 324/161; 324/162
(58) Field of Classification Search .................... 416/18, 416/31, 35, 36, 44, 61; 415/13, 30, 118; 73/493, 510, 511; 324/160–163, 166
   See application file for complete search history.

(56) References Cited

U.S. PATENT DOCUMENTS

| 5,083,039 A | 1/1992 | Richardson et al. |
| 5,493,909 A | 2/1996 | Araki |
| 7,010,968 B2 * | 3/2006 | Stewart et al. .................. 73/146 |
| 2001/0045128 A1 * | 11/2001 | McCall et al. .................. 73/511 |
| 2002/0047715 A1 | 4/2002 | Holm |
| 2004/0083811 A1 | 5/2004 | Kranz |
| 2004/0151577 A1 * | 8/2004 | Pierce et al. .................. 415/4.1 |
| 2004/0151584 A1 | 8/2004 | Blakemore |
| 2005/0151377 A1 | 7/2005 | Ichinose et al. |
| 2008/0157533 A1 | 7/2008 | Flottemesch et al. |

FOREIGN PATENT DOCUMENTS

| DE | 3412642 A1 | 10/1984 |
| DE | 4142058 A1 | 8/1992 |
| EP | 0517082 A2 | 12/1992 |
| EP | 1172656 A1 | 1/2002 |
| EP | 1524433 A1 | 4/2005 |
| EP | 1835293 A1 | 9/2007 |
| WO | 9957435 A1 | 11/1999 |
| WO | 2005091490 A1 | 9/2005 |

\* cited by examiner

Primary Examiner — Charles Garber
Assistant Examiner — Bryan Junge

(57) ABSTRACT

A method of determining at least one rotation parameter of a wind turbine rotor rotating with a rotation speed and a phase is provided. The method includes: measuring an effective centrifugal force acting in a first pre-determined direction, which is defined in a co-ordinate system rotating synchronously with the rotor, on at least one reference object located in or at the rotor, establishing a first angular frequency representing the rotation speed of the rotor on the basis of variations in the measured effective centrifugal force due to gravitational force, establishing a second angular frequency representing the rotation speed of the rotor by use of at least one yaw rate gyro, and establishing the value of the rotation speed as the rotational parameter by correcting the second angular frequency by comparing it to the first angular frequency.

8 Claims, 2 Drawing Sheets

WIND TURBINE AND METHOD OF DETERMINING AT LEAST ONE ROTATION PARAMETER OF A WIND TURBINE ROTOR

CROSS REFERENCE TO RELATED APPLICATIONS

This application is a divisional of U.S. Ser. No. 12/224,901, filed Sep. 9, 2008. U.S. Ser. No. 12/224,901 now U.S. Pat. No. 8,092,174 is the US National Stage of International Application No. PCT/EP2007/050041, filed Jan. 3, 2007 and claims the benefit thereof. The International Application claims the benefits of European application No. 06005334.5 filed Mar. 15, 2006. All of the applications are incorporated by reference herein in their entirety.

FIELD OF INVENTION

The present invention relates to a wind turbine and method of determining at least one rotational parameter, such as rotation speed and phase of a wind turbine rotor.

BACKGROUND OF THE INVENTION

Wind turbines are used to produce electrical power from the energy contained in blowing wind. The wind turbine comprises a rotor which is driven by the wind and which in turn drives an induction generator, which usually is an AC generator.

When the wind turbine is connected to a utility grid which requires a certain frequency, e.g. 50 Hz in Europe, the electrical power output of the wind turbine needs to be synchronized to this frequency. As modern wind turbines often work with variable rotational speed of the rotor and thus of the AC induction generator a conversion from the frequency produced in the generator to the frequency of the utility grid is necessary. This conversion is usually performed by transforming the AC voltage delivered by the generator into a DC voltage which is then transformed again into an AC voltage with fixed frequency. The AC voltage will then be fed into the utility grid.

To keep the frequency and the voltage fed into the utility grid in tolerable ranges, control systems are used for controlling this values. For the calculations performed with regard to such controlling the knowledge of the rotational speed and the phase angle of the rotor, i.e. the angle of a radial line extending from the rotor's center and rotating together with the rotor relative to a non-rotating reference line through the center of the rotor, is very useful. Variable speed wind turbines having a control mechanism for controlling the voltage fed into the utility grid are, e.g., disclosed in WO 2005/091490 A1 or U.S. Pat. No. 5,083,039.

The rotational speed of the rotor and the phase angle of the rotor are usually measured inside the nacelle where the rotational speed is measured at a low-speed or high-speed shaft of the rotor by an inductive sensor. The phase angle of the rotor is usually measured by an absolute encoder placed at the end of the rotor's slip ring. However, in these measurements the speed and the phase angle are measured in a local frame of reference, i.e. relative to the position of the wind turbines tower top. This leads to measurement errors if the tower top is moving. These measurement errors introduce an apparent cyclic oscillation of the measured rotor speed that is only in artefact. Any control mechanisms based on such measurement values include the risk of introducing artificial control requirements. Moreover the speed measurement at the high-speed shaft lacks information on the phase angle of the rotor and may include torsion oscillations.

SUMMARY OF INVENTION

Therefore it is an objective of the present invention to provide a method of determining at least one rotation parameter of a wind turbine rotor. It is a further objective of the present invention to provide an improved wind turbine, which in particular allows an improved measurement of at least one rotation parameter of its rotor.

The mentioned objectives are solved by a method of determining at least one rotation parameter of a wind turbine rotor, and by a wind turbine. The depending claims define further developments of the present invention.

In the inventive method of determining at least one rotation parameter of a wind turbine rotor rotating with a rotation speed and a phase comprises the steps of measuring an effective centrifugal force acting in a first pre-determined direction, which is defined in a coordinate system rotating synchronously with the rotor, on at least one reference object located in or at the rotor. On the basis of variations in the measured effective centrifugal force a first angular frequency representing the rotation speed of the rotor is established. A second angular frequency representing the rotation speed of the rotor is established by use of at least one yaw rate gyro. To establish the value of the rotation speed as the rotational parameter, this second and angular frequency is corrected by comparing it to the first angular frequency.

By the inventive method the rotation speed of the rotor is always measured in a global frame of reference, thereby avoiding errors caused by tower top movements. The measured effective centrifugal force varies during the rotation period of the rotor. The reason therefore is that the measured effective centrifugal force is given by the sum of the actual centrifugal force, i.e. the centrifugal force resulting alone from the rotational movement of the rotor, and the projection of the gravitational force on the direction in which the actual centrifugal force is acting. This projection varies during a rotational cycle of the rotor. For example, when the rotor is in such a position that the centrifugal force acts on the reference object in a direction pointing towards the earth then the measured effective centrifugal force is the sum of the absolute value of the actual centrifugal force and the absolute value of the gravitational force acting on the reference object. When, on the other hand, the rotor is in such a position that the actual centrifugal force is acting on the reference object in a direction which points away from the earth by 180° then the measured effective centrifugal force is the absolute value of the actual centrifugal force minus the absolute value of the gravitational force acting on the reference object. In between those two stages of the rotation the value of the measured centrifugal force lies between the two described values, which define a maximum value and a minimum value. As a consequence, the measured effective centrifugal force oscillates around the actual centrifugal force when the rotor is rotating. As the direction in which the gravitational force, which causes these oscillations, always points towards the earth the rotation is measured relative to the earth as global reference frame.

It shall be noted that the centrifugal force acting on the rotating reference object is not a true force. The true force is the so called centripetal force which acts towards the centre of the rotation and keeps the reference object moving on a circle of a fixed radius. The centrifugal force is a fictitious force experienced by the reference object in the rotating coordinate system. It is due to the reference object's inertia and looks in the rotating coordinate system as if it would pull the reference object away from the center of rotation. The (real) force counter acting the (fictitious) centrifugal force, i.e. the reference object's inertia effect, for keeping the radius of the circle constant is the centripetal force. Hence, if the radius of the circle is kept constant, the centrifugal force has the same absolute value than the (fictitious) centrifugal force and is oriented in the opposite sense. The measurement of the centrifugal is therefore in fact a measurement of the centripetal force which is necessary to keep the reference object on its circle. However, as the measured centripetal force differs from the centrifugal force only in its sign the measurement will still be referred to as measurement of a centrifugal force in the following.

When the rotation speed is measured by the yaw rate gyro the rotor speed is also measured with reference to a global reference frame. In a yaw rate gyro a spinning element is used. The spin axes of an undisturbed spinning element has, due to conservation of angular momentum, a fixed direction in space. The rotation speed of the rotor is measured by a disturbance on the spinning element which is caused by the rotation of the rotor. The disturbance leads to a precession of the spin axis around the direction of the undisturbed spin axis which is the basis of the measurement of the rotors rotation speed. As a consequence the measurement of the rotor speed with yaw rate gyro is performed in a global frame of reference.

By the use of the measured effective centrifugal force the angular frequency of the rotating rotor can be established with certain degree of noise. However, the average angular frequency can be established very precisely. Therefore, if only a precise average value for the rotor's angular frequency is needed to be established, the invention could be realized without the measurement by the yaw rate gyro. On the other hand, in the yaw rate gyro's measurement values less noise is present but the average angular frequency established by the yaw rate gyro is not as precise as the value established by use of the measured effective centrifugal force. Therefore, the measurement of the yaw rate gyro is corrected by comparing it to the angular frequency established on the basis of the measured effective centrifugal force in order to achieve a precise average value for the angular frequency of the rotor with few noise. Such a value is very valuable for controlling the wind turbine. If a precise average value for the rotor' angular frequency is not needed, the invention could be realized without the measurement of the effective centrifugal force.

In a further development of the inventive method an effective centrifugal force acting in a second pre-determined direction, which is defined in a coordinate system rotating synchronously with the rotor and which is not parallel to the first pre-determined direction, on at least one reference object located in or at the rotor is measured. On the basis of the measured effective centrifugal forces acting in the first and second directions the phase of the rotor is established. When measuring only an effective centrifugal force in a single direction it is not possible to establish the phase. The reason is that the direction the gravitational force is directing in gets lost when only its projection on one direction of the rotating coordinate system is determined. With measuring the effective centrifugal force in a second non-parallel direction it is possible also to determine the vector of the gravitational force with respect to the rotating coordinate system, i.e. direction the gravitational force is directing in with reference to the rotating coordinate system. From the direction the gravitational force is acting in with respect to the rotating coordinate system, the phase of the rotation can be determined. Please note that although the vector components of the gravitational force are determined in the rotating coordinate system the frame of reference is still a global frame of reference as the basis of establishing the phase is the vector of the gravitational force which always points towards the earth. Please note that determining of the phase is easiest when the two non-parallel directions in which the effective centrifugal forces are measured are perpendicular to each other.

It is desirable to have the reference object located in or at the hub of the rotor, i.e. near the rotor's rotation axis. As it has already been mentioned before, the effective centrifugal force oscillates about the value of the actual centrifugal force. Hence, the actual centrifugal force produces an offset in the oscillation which would lead to a DC offset in an AC electrical signal representing the measurement. The value of the actual centrifugal force acting on the reference object, however, depends on the reference object's distance from the rotation axis. The bigger the distance of the reference object from the rotation axis is, the bigger is this off-set. In addition, the actual centrifugal force, and therefore the offset, also depends on the rotation speed. Hence, the dependence on the rotation speed introduces additional variations in the result of the measurement. These variations increase with increasing distance of the reference object from the rotation axis and need to be taken into account when establishing the rotational frequency unless the reference object is positioned sufficiently close to the rotation axis.

As suitable means for calculating the angular frequency and/or the phase of the rotating rotor from the measured effective centrifugal force or forces is a phase locked loop (PLL). In this case, an electrical signal representing the measured effective centrifugal force is produced for each measured effective centrifugal force and fed into the phase locked loop. The first angular frequency and/or the phase of the rotor are/is then established by the phase locked loop. The phase locked loop my either be implemented as a hardware module or a software module, e.g. in a digital signal processor.

An inventive wind turbine with a rotor including a hub and at least one rotor blade fixed to the hub is suitable for performing the inventive method of determining at least one rotation parameter of the rotor. At least one accelerometer and at least one yaw rate gyro are located in or at the rotor. Moreover, the inventive wind turbine comprises a processing means which is designed to establish an angular frequency representing the rotation speed of the rotor on the basis of the outputs of the at least one accelerometer and the at least one yaw rate gyro.

In the inventive wind turbine, an effective centrifugal force can be measured with the accelerometer which can then be used in the inventive method. In addition, the rotor speed can also be measured with the yaw rate gyro. From the outputs of the accelerometer and the yaw rate gyro the processing means can establish the rotational speed, as described in the inventive method.

It is advantageous if the at least one accelerometer is located in or at the hub of the rotor. In this case an offset in the oscillations of the measured effective centrifugal force due to the actual centrifugal force can be kept small.

When the used accelerometer is a dual-axis accelerometer, the phase of rotor can also be established according to the inventive method. It shall be noted that the phase can also be established if two accelerometers or more are used instead of a dual-axis accelerometer as long as at least two accelerometers measure the effective centrifugal force in two different, non-parallel directions.

As a processing means for establishing the rotation speed and/or phase of the rotor a means which comprises a phase locked loop can be used.

BRIEF DESCRIPTION OF THE DRAWINGS

Further features, properties and advantages of the present invention will become clear by the following description of embodiments of the invention with reference to the accompanying drawings.

DETAILED DESCRIPTION OF INVENTION

Figure 1:
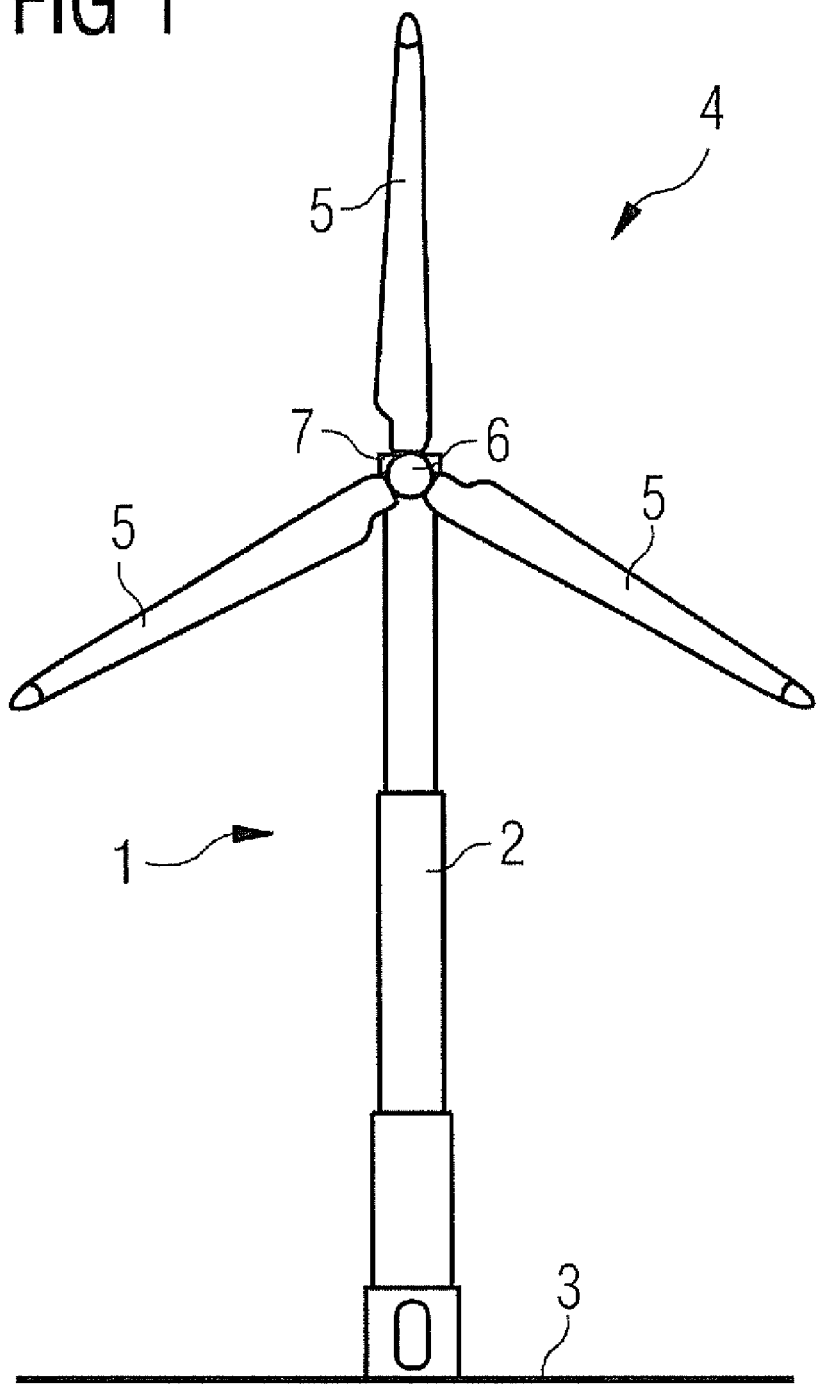
FIG. 1 shows a typical wind turbine.

A typical wind turbine is shown in FIG. 1. The wind turbine 1 comprises a tower 2 which rests on a fundament in the ground 3 and at the top of the tower, a rotor 4. In the present embodiment, the rotor is equipped with three rotor blades 5 which are suspended in a rotor hub 6 which in turn is anchored in a nacelle 7 located at the top of the tower 2. Although the wind turbine 1 shown in FIG. 1 rests on the ground it is also possible that it rests on a platform anchored in the seabed. Moreover, although the rotor 4 in FIG. 1 has three rotor blades 5 it may have any number of rotor blades, i.e. at least one rotor blade. However, rotors with two and in particular with three rotor blades are most commonly used.

For a control of the wind turbines 1 operations it is desirable to know the rotation speed and the phase of the rotor 4 in a global frame of references so that errors in establishing rotor speed and phase due to movements of the top of the tower 2 can be avoided. A method of establishing rotor speed and phase in a global frame of reference will now be described with reference to FIGS. 2 and 3.

Figure 2:
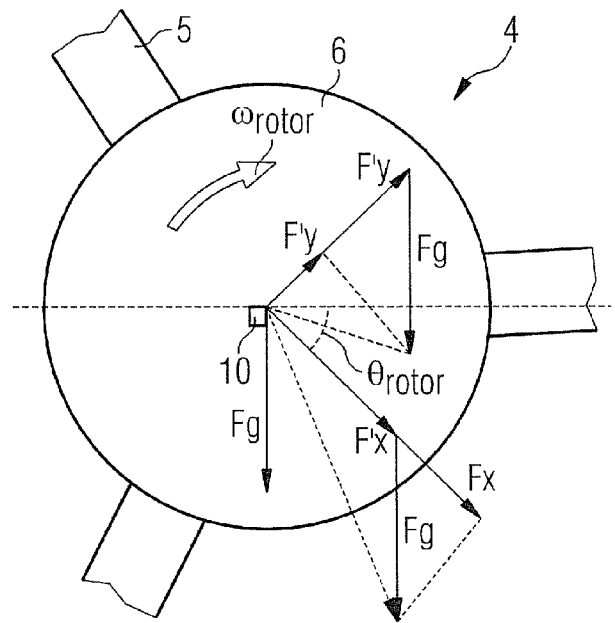
FIG. 2 shows the forces acting on a reference object located in the rotor of a wind turbine.

FIG. 2 shows, in a highly schematic view, a rotor hub 6 of the rotor 4. Close to the center of the rotor hub 6, a dual-axis accelerometer 10 is fixed to the hub. A yaw rate gyro 14 (see FIG. 3) is also fixed to the hub.

In the accelerometer 10, a force on a reference object 11 leads to a deflection of the reference object 11 which in turn gives a measure for the strength of the force acting on the reference object 11. In the dual-axis accelerometer 10 forces can be measured which act in perpendicular directions. When the rotor 4 is rotating around its rotational axis the accelerometer 10 rotates together with the rotor 4. The rotation leads to a centrifugal force on the at least one reference object.

With dual axis accelerometer an effective centrifugal force $F_x$ in a first direction and an effective centrifugal force $F_y$ in a second direction perpendicular to the first direction can be measured. This effective centrifugal forces, are the projection of the vector sum of the respective actual centrifugal force $F'_x$, $F'_y$ and the gravitational Force $F_g$ acting on the reference object in the direction of the respective actual centrifugal force $F'_x$, $F'_y$. The strengths of the resulting forces $F_x$, $F_y$, which are referred to as effective centrifugal forces throughout the present invention, depend on the direction in which actual centrifugal forces $F'_x$, $F'_y$ are acting. As the accelerometer 10 rotates together with the rotor 4 this directions rotate too. Therefore the measured values of the effective centrifugal force $F_x$, $F_y$ oscillate between a maximum value, when the direction of the respective actual centrifugal force $F'_x$, $F'_y$ point towards the ground, and a minimum value, when the direction of the respective actual centrifugal force $F'_x$, $F'_y$ point away from the ground. Thus the accelerometer 10 measures oscillating effective centrifugal forces $F_x$, $F_y$ oscillating about the value of the actual centrifugal forces $F'_x$, $F'_y$. By the oscillating values for $F_x$ and $F_y$ the rotation speed and the phase of rotation of the rotor 4 can be established as will be described with reference to FIG. 3.

Although a dual-axis accelerometer 10 is used in the present embodiment, two accelerometers with non-parallel sensitive directions could be used as well. Further, if only the rotation speed is to be established it would be possible to only use one accelerometer with only one sensitive access.

Figure 3:
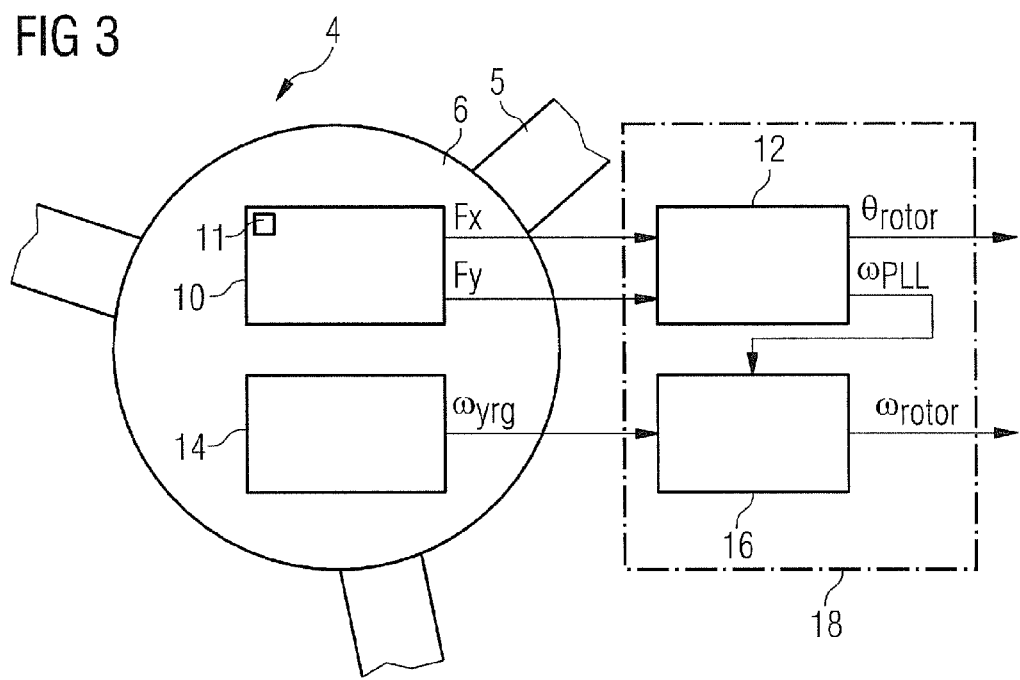
FIG. 3 shows in form of block diagram a device for establishing rotor speed and rotor phase.

FIG. 3 shows a processing means 18 for determining the rotation speed of the rotor 4 in form of a block diagram. The processing means 18, which is implemented as a digital signal processor in the present embodiment, comprises, as main components, a phase locked loop 12 connected to the output of the accelerometer 10 and an auto calibration unit 16 connected to the output of the yaw rate gyro 14 and the output of the phase locked loop 12.

The output signals of the dual-axis accelerometer 10, which are electrical AC signals resenting the measured effective centrifugal forces $F_x$, $F_y$, are fed to the phase locked loop 12 which establishes a phase $\theta_{rotor}$ of the rotating rotor 4 and a first angular frequency $\omega_{PLL}$, which represents the rotation speed of the rotor 4, based on the output values of the accelerometer 10. As vibrations in the rotor hub 6 introduce noise into the measurement values of the accelerometer 10 which is amplified in an amplifier of the phase locked loop 12 the first angular frequency $\omega_{PLL}$ is relatively noisy, even if the reference object 11 is located close to the rotation axis of the rotor 4. However, if averaged over time, the average value for the first angular frequency $\omega_{PLL}$ is highly precise.

As also shown in FIG. 3, a second angular frequency $\omega_{yrg}$ is established by the yaw rate gyro 14. Compared to the first angular frequency $\omega_{PLL}$ this second angular frequency $\omega_{yrg}$ is less noisy. However the average value, if averaged over time, is less precise than the average value for the first angular frequency $\omega_{PLL}$. In order to achieve a third angular frequency $\omega_{rotor}$, which is on the one hand less noisy than the first angular frequency $\omega_{PLL}$ and on the other hand has a more precise average value than the second angular frequency $\omega_{yrg}$, an electrical signal representing the second angular frequency $\omega_{yrg}$ is fed from the output of the yaw rate gyro into the auto calibration unit 16 into which also an output signal from the phase locked loop representing the first angular frequency $\omega_{PLL}$ is fed for calibrating the electrical signal representing the second angular frequency $\omega_{yrg}$. The result of the calibration is an electrical output signal of the processing means 18 which represents in turn the third angular frequency $\omega_{rotor}$ which in turn represents the actual rotor speed $\omega_{rotor}$ of the rotor 4.

The inventive method and the inventive wind turbine reduce measurement errors in measurements of the rotor speed. In particular measurement errors caused by tower top movement can be eliminated.

The invention claimed is:

1. A wind turbine with a rotor including a hub and at least one rotor blade fixed to the hub, comprising:
    an accelerometer and an least one yaw rate gyro arranged in or at the rotor; and
    a processor that establishes at least an angular frequency representing the rotation speed of the rotor on the basis of outputs of the accelerometer and the yaw rate gyro.

2. The wind turbine as claimed in claim 1, wherein the accelerometer is located in or at the hub.

3. The wind turbine as claimed in claim 1, wherein yaw rate gyro is located in or at the hub.

4. The wind turbine as claimed in claim 1, wherein the at least one accelerometer is a dual-axis accelerometer.

5. The wind turbine as claimed in claim 4, wherein a phase of the rotor is determined via the dual-axis accelerometer.

6. The wind turbine as claimed in claim 1, wherein the processor comprises a phase locked loop and an auto calibration unit.

7. The wind turbine as claimed in claim 6,
wherein the accelerometer is configured to output an effective centrifugal force acting in a first pre-determined direction on at least one reference object located in or at the rotor,
wherein the first pre-determined direction is defined in a co-ordinate system rotating synchronously with the rotor, and
wherein the yaw rate gyro is configured to determine a second angular frequency representing the rotation speed of the rotor.

8. The wind turbine as claimed in claim 7,
wherein the phase locked loop is electronically coupled to the accelerometer to receive the effective centrifugal force,
wherein the phase locked loop is configured to use the effective centrifugal force to determine a phase of the rotating rotor and to determine a first angular frequency,
wherein the auto calibration unit is electronically coupled to the yaw rate gyro to receive the second angular frequency and electronically coupled to the phase locked loop to receive the first angular frequency,
wherein the auto calibration unit is configured to use the first and second angular frequency to determine the actual rotor speed.

* * * * *